United States Patent
Chang et al.

(10) Patent No.: US 6,501,785 B1
(45) Date of Patent: Dec. 31, 2002

(54) DYNAMIC FREQUENCY HOPPING

(75) Inventors: Li Fung Chang, Holmdel, NJ (US); Kapil K. Chawla, Middletown, NJ (US); Justin C. Chuang, Holmdel, NJ (US); Zoran Kostic, Holmdel, NJ (US); Nelson Sollenberger, Tinton Falls, NJ (US); Xiaoxin Qiu, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/472,784

(22) Filed: Dec. 28, 1999

Related U.S. Application Data

(60) Provisional application No. 60/165,913, filed on Nov. 17, 1999.

(51) Int. Cl.[7] .................................................. H04J 13/06
(52) U.S. Cl. ........................................ 375/133; 455/452
(58) Field of Search ................................. 375/130, 132, 375/133, 135, 134, 136, 137; 370/252, 337, 442; 455/452

(56) References Cited

U.S. PATENT DOCUMENTS

| | | | | | |
|---|---|---|---|---|---|
| 4,716,573 A | * | 12/1987 | Bergstrom et al. | ........... | 375/132 |
| 5,235,613 A | * | 8/1993 | Brown et al. | ........... | 375/135 |
| 5,394,433 A | * | 2/1995 | Bantz et al. | ........... | 375/132 |
| 5,612,971 A | * | 3/1997 | Dormer | ........... | 375/133 |
| 5,719,868 A | * | 2/1998 | Young | ........... | 370/436 |
| 5,781,536 A | * | 7/1998 | Ahmadi et al. | ........... | 370/252 |
| 5,870,385 A | * | 2/1999 | Ahmadi et al. | ........... | 370/252 |
| 5,896,375 A | * | 4/1999 | Dent et al. | ........... | 370/347 |
| 6,215,810 B1 | * | 4/2001 | Park | ........... | 375/131 |
| 6,278,723 B1 | * | 8/2001 | Meihofer et al. | ........... | 375/131 |
| 6,289,038 B1 | * | 9/2001 | Park | ........... | 375/131 |
| 6,331,973 B1 | * | 12/2001 | Young et al. | ........... | 370/337 |
| 6,381,053 B1 | * | 4/2002 | Fathallah et al. | ........... | 359/130 |

* cited by examiner

*Primary Examiner*—Amanda T. Le

(57) ABSTRACT

This invention provides a dynamic frequency hopping system that utilizes information from multiple base stations. The system assigns frequency hopping patterns based on current interference and traffic environments to avoid interference thus gaining the benefits of interference averaging and interference avoidance. The system imposes less stringent measurement requirements on terminals (wireless mobile devices) because many measurement requirements are replaced by generating estimates based on measurement data received from other base stations within a base station neighborhood. The system may continuously verify that the frequency hopping patterns assigned to the links of the system optimizes system performance. The system compares system performance of possible frequency hopping patterns against currently assigned frequency hopping pattern to optimize system performance. When a request for a link is received, a similar process as above is performed where the request is granted/denied/delayed based on system optimization requirements. In this way, the frequency hopping patterns of the links of the system may be assigned so that an optimum system performance may be obtained.

26 Claims, 11 Drawing Sheets

DYNAMIC FREQUENCY HOPPING

This Application is a Provisional claiming benefits under U.S. patent Ser. No. 60/165,913 filed on Nov. 17, 1999.

BACKGROUND OF THE INVENTION

1. Field of Invention

This invention relates to dynamic frequency hopping.

2. Description of Related Art

Frequency hopping patterns are used in wireless communications to take advantage of interference averaging effects obtained by changing frequencies when transmitting a block of data. Conventionally, frequency hopping patterns have been selected in a random matter. However, with increasing popularity of wireless systems such as cellular phones or personal digital assistance (PDAs), greater efficiency in resource utilization is required than provided by random frequency hopping. Thus, new technology is needed to increase resource utilization efficiency.

SUMMARY OF THE INVENTION

This invention provides a dynamic frequency hopping system that utilizes information from multiple base stations to optimize an estimated performance of each individual link, of all links supported by a single base station or of all currently active links supported by the complete communication system. The system assigns frequency hopping patterns based on current interference and traffic environments to avoid interference thus gaining the benefits of interference averaging and interference avoidance.

The system imposes less stringent measurement requirements on terminals (wireless mobile devices) because many measurement requirements are replaced by generating estimates based on measurement data received from other base stations within a base station neighborhood. A base station neighborhood of a first base station is a group of second base stations that may be affected by first links serviced by the first base station. The base station neighborhood may be defined by a link neighborhood. A link neighborhood of a link includes all other links whose interference to the link exceeds an interference threshold. Thus, any of the first links that is included in link neighborhoods of second links serviced by the second base stations may interfere with the second links. Therefore, the second base stations are included in the base station neighborhood of the first base station.

The dynamic frequency hopping system may continuously verify that the frequency hopping patterns assigned to the links of the system optimizes an estimated system performance. Each currently assigned frequency hopping pattern is compared against all other possible frequency hopping patterns that may be assigned to a particular link. A possible frequency hopping pattern that corresponds to a maximum possible estimated system performance is compared against a current estimated system performance corresponding to the current frequency hopping pattern. If the current estimated system performance is less than the maximum possible estimated system performance, then the frequency hopping pattern of the particular link is changed to the possible frequency hopping pattern to improve system performance.

When a request for a link is received by the dynamic frequency hopping system, a similar process as above is performed where the request is granted allocation of system resources and assigned a frequency hopping pattern if the total estimated system performance exceeds a performance threshold. If the performance threshold is not exceeded, then the request for a link may be either delayed or denied. In this way, the frequency hopping patterns of all the links of the system may be assigned so that an optimum system performance may be obtained.

BRIEF DESCRIPTION OF THE DRAWINGS

The invention is described with reference to the following figures, wherein like numerals identify like elements, and wherein.

DETAILED DESCRIPTION OF PREFERRED EMBODIMENTS

Figure 1:
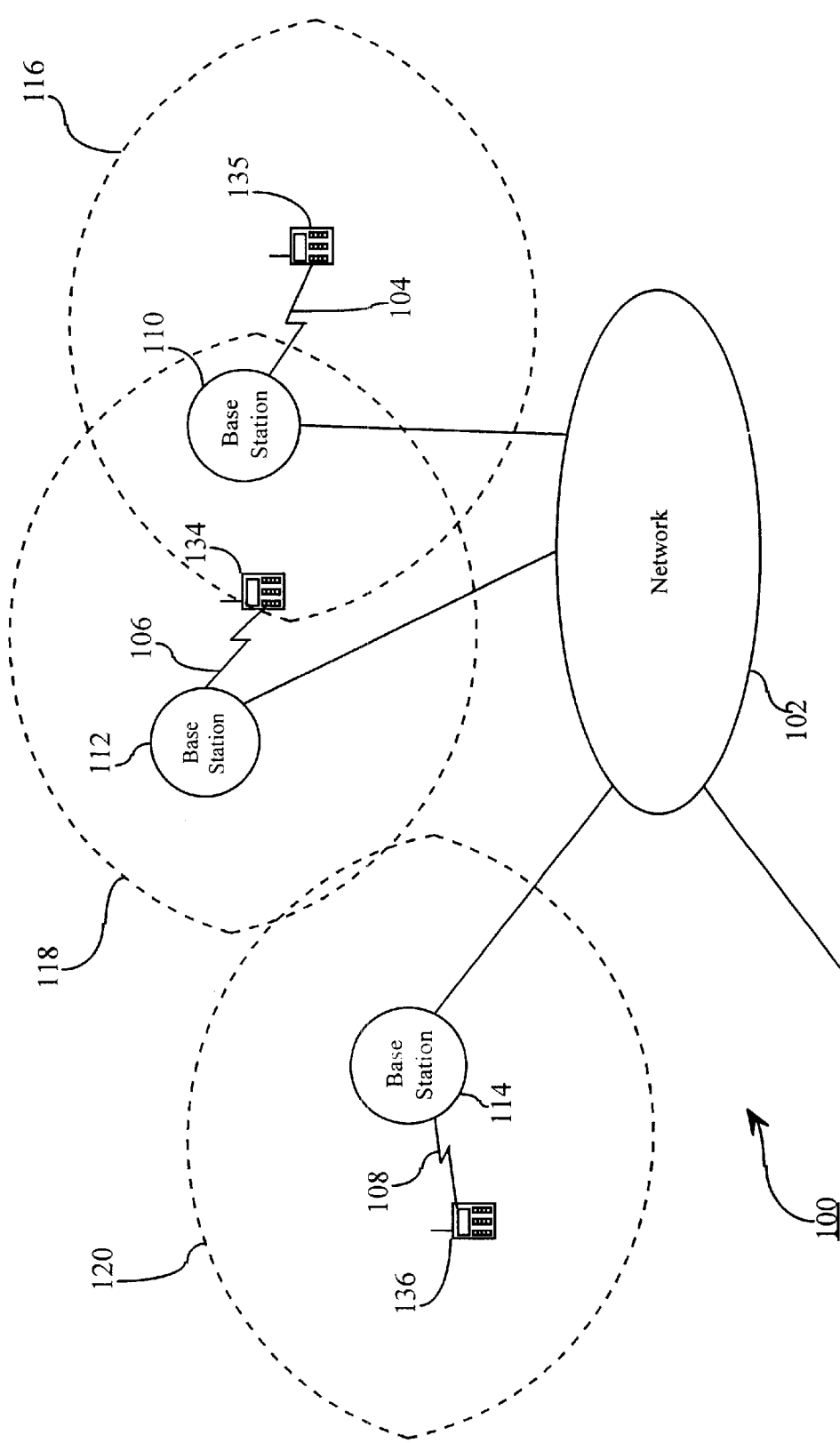
FIG. 1 is an exemplary block diagram of a dynamic frequency hopping system.

FIG. 1 shows a dynamic frequency hopping system 100 that makes frequency hopping pattern assignments based on information that is detected by terminals throughout the system, information derived from the detected information and/or information resulting from decisions made throughout the system. The dynamic frequency hopping system 100 includes a network 102 and base stations 110, 112 and 114. The base stations 110–114 are coupled to the network 102 which provides inter-base station communication for allocating wireless network resources for frequency hopping.

The dynamic frequency hopping system 100 also includes terminals 134–136 wirelessly communicating with the base stations 110–1 14 via links 104–108, respectively. Associated with each of the links 104–108 is a link neighborhood 116–120. FIG. 1 shows the link neighborhoods 116–120 as contours which may be defined based on parameters such as geographic areas, interference and/or noise thresholds, N largest interference/noise sources, etc. As an example, FIG. 1 shows link neighborhood 118 of link 106 including link 104 while excluding link 108.

Each of the terminals 134–136 may detect or measure information such as path gain between each of the terminals 134–136 and the base stations 110–114 and transmit the detected information to a select one of the base stations 110–114. The terminals 134–136 may select a respective base station 110–114 based on path gain information. For example, the terminal 134 may detect signal strength from control signals being transmitted by each of the base stations 110–114 and select the base station 112 because the path gain with the base station 112 is the largest. Then the terminal 134 transmits all the detected information or information derived from the detected information to the base station 112. The control signal transmitted by the base station 110–112 may include a base station identification, an identification of a channel on which a terminal 134–136 may transmit the detected information, etc. as is well known in the art.

When a request for a link 106 for the terminal 134 is received (e.g., the terminal 134 makes a call or the terminal 134 receives a call), the base station 112 may allocate wireless communication resources to the link 106 based on resource allocation techniques disclosed in U.S patent applications entitled "Allocation of Wireless Network Resources" filed by Chawala et al., on Dec. 3, 1999, having Ser. No. 09/453,565; and "Wireless Resource allocation" filed by Chawala et al., on Dec. 3, 1999, having Ser. No. 09/453,566, for example. Both of the above-two U.S. applications are hereby incorporated by reference. Instead of a single frequency or channel as discussed in the above applications, a frequency hopping pattern is allocated that optimizes the system. The dynamic frequency hopping system 100 assigns the frequency hopping pattern to the terminal 134 based on the techniques applied to channels in the above applications.

Figure 2:
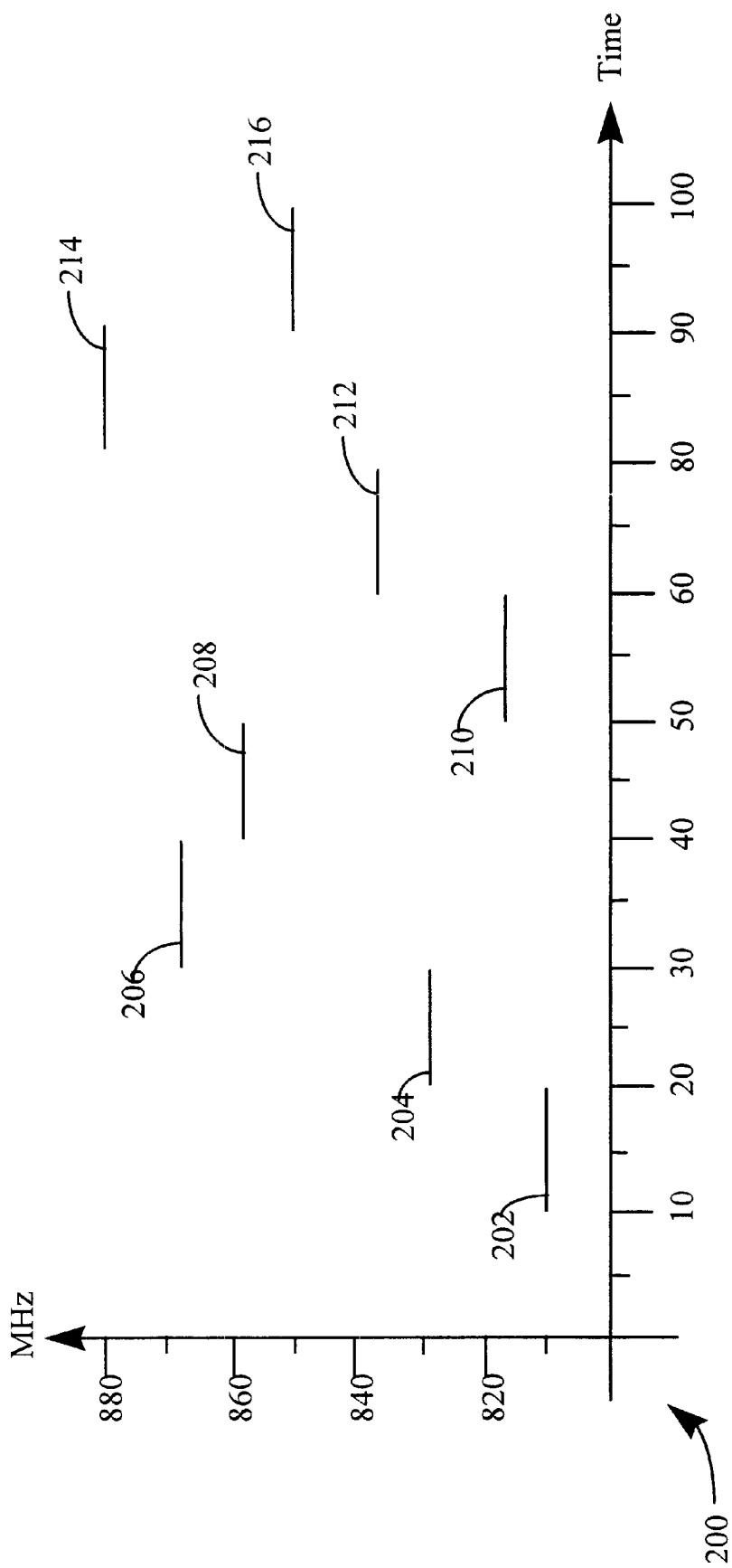
FIG. 2 is an exemplary diagram of a frequency hopping pattern.

FIG. 2 shows an example of a frequency hopping pattern 200 that may be assigned to the terminal 134. The frequency hopping pattern 200 includes a pattern of eight different frequencies 202–216 where each frequency is used for transmission for a duration (or dwell) of 10 milliseconds (ms). The sequence of frequencies is the hopping pattern that is assigned and transmitted to the terminal 134. The terminal 134 communicates with the base station 112 by transmitting information in the frequency sequence and duration of each frequency as specified by the frequency hopping pattern. Thus, the terminal 134 may begin by transmitting information using frequency 202 for a duration of 10 ms and then transmits information using frequency 204 for the next 10 ms, and so on. When transmission using the frequency 216 is completed, the terminal 134 repeats the frequency hopping pattern until either the communication is completed or until the frequency hopping pattern is changed by the base station 112.

While the exemplary frequency hopping pattern 200 shows eight frequencies of 10 milsecs per frequency and a frequency range varying between 810 MHz to 880 MHz, the particulars of a frequency hopping pattern may be changed and adapted based on specific implementation details. For example, the frequency range of the hopping pattern may be regulated by various government entities and the duration of each of the frequencies in the frequency hopping pattern may be determined based on wireless transmission conditions such as noise environment, congestion, etc. This invention provides a dynamic frequency hopping system 100 that selects a frequency hopping pattern which optimizes system performance.

Conventional frequency hopping patterns provides benefits of interference averaging achieved by channel coding over multiple hops. Thus, if one or a few hops experience strong interference, the transmitted information can still be reliably recovered. Therefore, interference averaging provides robustness to sudden change in one or more interferers as well as robustness to measurement and estimation errors and fading of the channel. This invention further extends the benefits of frequency hopping by ensuring that the frequency hops experience weaker interference by avoiding strong interferers.

It is assumed that all the links 104–108 are synchronized (i.e., frequency and frame) so that all the links 104–108 hop from one frequency to another frequency at substantially the same time. Thus, interference among the links 104–108 may be determined without considerations of the percentage of time that interference may occur. Additionally, it is assumed that interference between links occurs when the links 104–108 are communicating within a same frequency neighborhood (i.e., those frequencies whose cross frequency interference exceeds a threshold set as a system parameter). For a frequency neighborhood of 1, interference occurs when more than one link 104–108 communicate using the same frequency. However, adjacent frequencies may also interfere. Thus, depending on specific circumstances, frequency neighborhoods of more than one may be considered. In the following discussion, frequency neighborhood of 1 is assumed. Thus, different frequencies in a frequency hopping pattern are assumed not to interfere with each other. However, the following discussion may be extended to frequency neighborhoods of greater than 1.

As is discussed below, the signal-interference-plus-noise-ratio (SINR) of a link may be defined in terms of power and path gains of all currently active links for a frequency neighborhood. Thus, to avoid any interference, all of the frequencies assigned to frequency hopping patterns for currently active links may not be assigned to another link for the same dwell period. However, if two links are separated in such a way that the path gains between a receiver of one link and a transmitter of another link is below a path gain threshold, then the two links may be considered non-interfering and frequencies of the same frequency neighborhood may be assigned to the two links for the same dwell period.

Based on the above, a link neighborhood may be associated with each link where a first link (a transmitter of the link, for example) may be included in a link neighborhood of a second link (a receiver of the second link, for example) if the path gain between the respective transmitter and receiver of the two links is less than a path gain threshold.

Based on the above, the link neighborhood 118 of FIG. 1 includes the link 104 if the link 104 is a downlink from the base station 110 to the terminal 134 and the link neighborhood 116 includes the link 106 if the link 106 is uplink from the terminal 134 to the base station 112.

The size of the link neighborhoods 116–120 may be adjusted depending on a particular cost/performance levels desired. The link neighborhoods 116–120 may be selected based on a trade off between optimizing performance of the wireless communication system 100 and resources of the network 102 (i.e., costs) that are required to support that performance. In the ideal case, the link neighborhoods 116–120 may be defined to include all links 104–108 of the wireless communication system 100. If such a definition is assumed, then path gain and other information from all the base stations 110–114 of the dynamic frequency hopping system 100 must be included to determine whether to allocate resources such as to assign a frequency hopping pattern to a requested link. For this case, all the base stations 110–114 are required to constantly communicate with every other base station in the dynamic frequency hopping system 100 to achieve optimum system performance. The cost to support such a communication may be very high.

The cost may be reduced while controlling the impact on system performance by limiting the size of the link neighborhoods 116–120 based on magnitudes of interference that are expected to be received, for example. The link neighborhood of link r may be defined as follows:

1) sort all links of a wireless communication system in a descending order based on a magnitude of interference that may be expected from a link q on link r; then
2) select the first $K_r$ links q in the sorted order to be the link neighborhood for link r.

In this way, the size of a link neighborhood $K_r$ may be balanced against an efficiency of the frequency assignments by accounting for interference that may be sustained by other links 104–108 within the link neighborhood of a limited size. Thus, cost and performance are optimized by balancing the magnitude of $K_r$ against the cost required to provide inter-base station communications over the network 102.

Figure 3:
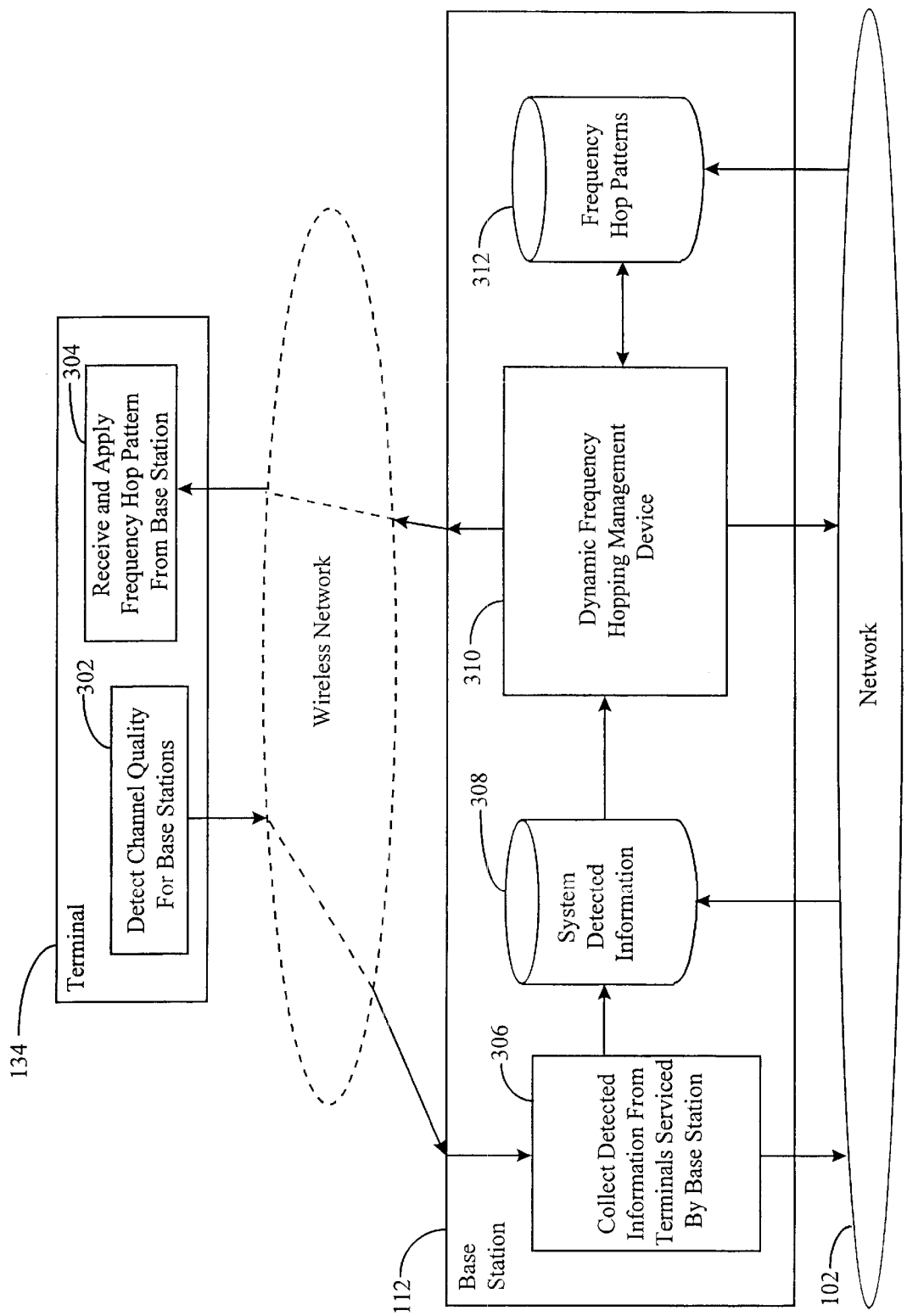
FIG. 3 is an exemplary diagram illustrating a base station in connection with a terminal.

FIG. 3 shows a functional block diagram of the terminal 134 and the base station 112 as an example to discuss the dynamic frequency hopping pattern assignment process. The terminal 134 detects channel quality for all the base stations 110–114 from which the terminal 134 can receive control signals as shown in functional block 302. The detected information is transmitted wirelessly to the base station 112 which is servicing the terminal 134. The base station 112 collects the detected information from the terminal 134 and all other terminals that are serviced by the base station 112 as shown in functional block 306. The detected information that is collected by the base station 112 is stored in a database 308 as well as transmitted to other base stations 110, 114 via the network 102. The database 308 also stores detected information received from other base stations 110, 114 so that the database 308 has a "local" copy of all the detected information throughout the base station neighborhood.

The base station neighborhood of a base station 110–114 may be defined in terms of link neighborhoods of links 104–106 supported by the base stations 110–114. For example, a base station neighborhood of the base station 112 may include all those base stations 110, 114 supporting links 104–108 that may receive interference from links 104–108 supported by the base station 112.

For example, FIG. 1 shows that the link 106 is serviced by the base station 112, and the link 104 is serviced by the base station 110. The link 104 has a link neighborhood 116 that includes the link 106. Thus, the base station neighborhood of base station 112 includes the base station 110. The base station 114 may also be included in the base station neighborhood of the base station 112 if there was another link that is serviced by the base station 112 and that is included in the link neighborhood 120 of the link 108. Thus, the base station neighborhood for a selected base station 110–114 includes all those base stations 110–114 that support links 104–108 having link neighborhoods that include a link serviced by the selected base station. The database 308 includes all the detected information that are collected by the base stations 110–114 that are within the base station neighborhood of the base station 112.

The base station 112 also includes a frequency hopping pattern database 312. The database 312 receives frequency hopping patterns from all the base stations 110–114 within the base station neighborhood of the base station 112 as well as the frequency hopping patterns assigned by the base station 112. Thus, the database 312 includes the frequency hopping patterns of the links 104, 108 serviced by all the base stations 110, 114 within the base station neighborhood of the base station 112.

The base station 112 includes a dynamic frequency hopping management device 310 that processes the information of the system 100 stored in the database 308 and the frequency hopping patterns in the database 312 to generate new frequency hopping patterns for the links 106 supported by the base station 112. The base station 112 wirelessly transmits new frequency hopping patterns to the terminal 134. The terminal 134 receives the new frequency hopping pattern form the base station 112 as shown in block 304 and applies the new frequency hopping pattern for further communications.

The frequency hopping pattern assignment process may be performed in three alternative ways as described below.
Independent Assignment Each of the base stations 110–114 may independently assign frequency hopping patterns without any coordination among the base station 110–114 except for exchanging information such as detected information and frequency hopping pattern assignments, of all the base station 110–114. The independent assignment process may be performed based on a performance criteria such as signal-interference-to-noise-ratio (SINR), optimum estimated performance or optimum estimated gain as described below.

The SINR is used as a criterion for frequency hopping assignment decisions in the discussed below as an example. However, one or more other link quality parameters such as block error rate, frame error rate, bit error rate measure, etc. may also be used as criteria for the frequency hopping assignment decisions without departing from the spirit of the invention.

The SINR of a link i for a particular frequency may be defined by equation (1) below:

$$SINR_i = \frac{P_i G_{ii}}{\sum_{j \neq i} P_j G_{ji} + n_i} \quad (1)$$

where $P_i$ is the power transmitted over the link i, $G_{ii}$ is a path gain over the link i for a receiver of the link i, $P_j$ is the power transmitted over one or more links j, $G_{ji}$ is the path gain from transmitters of the links j to the receiver of link i, and $n_i$ is the receiver noise of the receiver. Thus, the numerator of equation (1) represents the power received by the receiver when receiving signals over the link i. The denominator represents the sum of all the interfering power received by the receiver of link i from all the transmitters of other links j transmitting in the particular frequency (or frequency neighborhood) for the link i plus the noise power at the receiver of link i. $P_i$ and $G_{ii}$ are available locally at a base station 110–1 14 that is servicing the link i and $P_j$ and $G_{ji}$ may be obtained (via the network 102) from one or more base stations 110, 114 servicing links j, if necessary.

The dynamic frequency hopping management device 310 may first determine the SINR for each of the frequencies assigned to frequency hopping patterns of currently active links serviced by the base station 112. Then, the dynamic frequency hopping management device 310 compares each of the SINRs against a SINR threshold. A number of frequencies in a frequency hopping pattern that is less than the SINR threshold is determined. When this number falls below a marking threshold, then the dynamic frequency hopping management device 310 marks the corresponding link for assignment of a new frequency hopping pattern.

Figure 4:
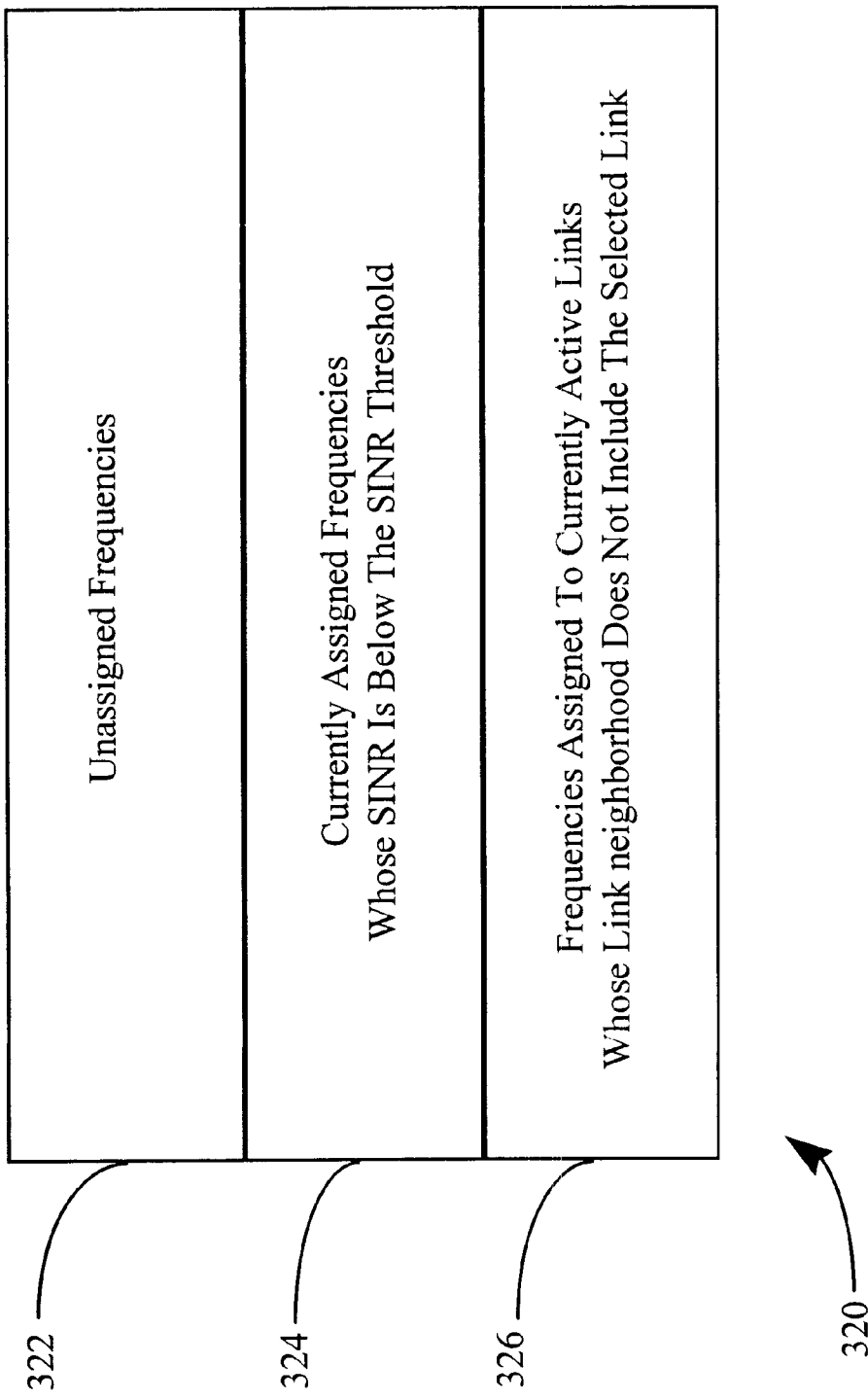
FIG. 4 is an exemplary diagram of available frequencies.

For each of the marked links, the dynamic frequency hopping management device 310 generates available frequencies that may be assigned to the frequency hopping patterns of the marked links. As shown in FIG. 4, the available frequencies 320 for a marked link includes a first block 322 of unassigned frequencies. A second block 324 of currently assigned frequencies whose SINR is below the SINR threshold is also included because the SINR for a frequency may change when assigned to a different link due to different geographical conditions, for example. Thus, while the SINR of a frequency for one link may be below the SINR threshold, the SINR for another link may exceed the SINR threshold. A third block 326 of frequencies assigned to currently active links whose link neighborhood does not include the marked link may also be included.

The third block 326 is generated for each of the marked links by verifying whether the marked link is within the link neighborhood of any currently active link. If the marked link is not in the link neighborhood of a currently active link, then all the frequencies in the frequency hopping pattern of the currently active link are included in the available frequency list for the marked link. This process is performed for all the currently active links to generate the third block 326 of available frequencies.

The dynamic frequency hopping management device 310 may assign the frequencies to each of the marked links based on assignment rules such as:

1) Randomly select frequencies that have associated SINRs that exceed an assignment threshold. Assign the selected frequencies to replace those frequencies that have SINRs that is below the SINR threshold;
2) Select the frequencies that have the highest SINRs of the available frequency list and assign the selected frequencies as replacement frequencies. The dynamic frequency hopping management device 310 may rank all the frequencies in the available frequencies 320 based on communication qualities that may be obtained if each of the available frequencies is assigned to the marked link as part of a new frequency hopping pattern. Then, the frequencies corresponding to the highest ranked SINRs are assigned as either new or replacement frequencies; and
3) Make tentative frequency assignments for all the marked links from respective lists of available frequencies. Assign as replacement frequencies the tentative assignment for all the marked links that results in an optimum estimated performance for all the links serviced by the base station 110–114.

Assignment guidelines 1 and 2 treat each link 106 separately from other links 106. However, some of the frequencies of the available frequencies for each of the marked links may occur in the available frequency list of other marked links serviced by the same base station 112 (e.g., the unassigned frequencies of block 322). Thus, the available frequencies may be generated when needed so that each of the available frequencies takes into consideration frequency assignments that have already been made.

The assignment guideline 3 may consider all possible frequency assignments in terms of optimum estimated link performance for all the links serviced by the base station 112 independent of whether a link is marked. In actual implementation, links may be marked and only marked links may be considered to reduce base station processing loads. Optimum estimated link performance may include frequency assignments that optimizes an estimated signal quality for a link 106, maximize a number of terminals 134–136 that may be serviced by the base station 112 or other performance characteristics that may be desired. For example, the dynamic frequency hopping management device 310 may not necessarily assign frequencies having the highest estimated performance for a selected link because the same available frequency may have highest SINR in more than one of the links. Thus, the dynamic frequency hopping management device 310 may consider spreading the highest SINR frequencies among all the links so that an overall optimum estimated performance for all of the active links may be obtained.

Optimum estimated performance corresponding to the available frequencies for each of the links may be based on any number of communication criteria. For example, if throughput is selected as a communication criterion, then the dynamic frequency hopping management device 310 generates an estimated throughput for each of the available frequencies for each of the links.

Estimated throughput $T_i^s$ for link i at frequency s using mode $m_i$ may be defined by equation (2) below.

$$T_i^s = R_{m_i}(1 - BLER_{m_i}(SINR_i)) \qquad (2)$$

where $m_i$ is a transmission mode for link i, $R_{m_i}$ is a radio interface rate for link i transmitting using mode $m_i$, $BLER_{m_i}$ is a block error rate for the mode $m_i$, and $SINR_i$ is the SINR for a receiver of link i. While equation (2) defines the throughput as a function of the SINR, other link quality parameters may also be used to define the throughput such as frame error rate and bit error rate measure.

The transmission mode $m_i$ is assigned to a link i for optimal transmission based on the transmission environment such as interference conditions. For example, different transmission modes such as QAM (Quadrature Amplitude Modulation), nPSK (n order phase shift keying), different types of coding (e.g., half rate coding), etc., have different transmission performance advantages depending on the transmission environment.

Based on the throughput generated using equation 2 above, the dynamic frequency hopping management device 310 may assign frequencies to optimize a total base station throughput parameter for the base station 112. The total estimated throughput for a frequency neighborhood q, $T^q$, is a sum of the estimated throughputs of all links actively supporting communications using the frequency q and may be defined by equation (3) below.

$$T^q = \sum_{i \in \text{all links in } q} T_i^q \qquad (3)$$

The dynamic frequency hopping management device 310 assigns frequencies to the links so that $T^q$ is maximized, for example. Alternatively, the dynamic frequency hopping management device 310 may assign any frequency combination that results in $T^q$ exceeding a threshold. In this way, the dynamic frequency hopping management device 310 may avoid generating all possible $T^q$s and may assign a first set of frequencies for which $T^q$ exceeds the threshold.

The dynamic frequency hopping management device 310 may also make frequency assignments based on a link quality parameter improvement. For example, the dynamic frequency hopping management device 310 may make frequency hopping pattern assignments based on a difference between an original base station link estimated performance before the frequency hopping patterns are changed and a maximum new base station's estimated link performance after the frequency hopping patterns are changed. The total estimated throughput for the marked links may be generated for the originally assigned frequencies and new estimated throughputs frequency hopping patterns may be generated for each new possible frequency assignment. If the largest new estimated throughput of all the possible frequency assignments does not exceed the original estimated throughput by a gain threshold, then the original frequencies may be retained or the link may be assigned a mode zero to temporarily stop transmission until a later time when better interference and/or noise conditions are encountered. If the threshold value is set to a positive value, then the above procedure may not change a frequency pattern unless a throughput improvement is obtained.

Token Passing Assignment

Token passing assignment accounts for possible adverse interaction of frequency hopping pattern assignments between multiple base stations 110–114. This technique provides a token passing procedure where only the base station 110–114 that possesses a token, for example, may assign new frequency hopping patterns to terminals 134–136 serviced by the base station 110–114. For example, the base station 110–114 may be configured in a ring order much like a token ring network. A token may be initiated at any one of the base stations 110–114 and the base station 110–114 that has the token may assign new frequency hopping patterns. When the base station 110–114 has completed the link frequency hopping pattern assignments or after a set period of time, the token may be passed on to a next base station 110–114 based on the ring order. In this way, at any one time, only one base station 110–114 is assigning new frequency hopping patterns to its terminals 134, 136.

The token passing procedure may also be controlled by a centralized token unit (not shown) where, a token is passed to a base station 110–114 by the centralized token unit via the network 102. When the frequency hopping pattern assignments are completed or after the set period of time, the token maybe sent to a next base station 110–114. The centralized token unit may easily change the sequence of base station frequency hopping pattern updates based on system wide conditions. Also, if necessary, selected base stations 110–114 may receive tokens more often than other base stations 110–114.

The dynamic frequency hopping management device 310 may make total estimated system performance optimizations under the token assignment alternative because all the other base stations that the frequency hopping pattern assignments remain static while the base station 110–114 that possesses the token is assigning its new frequency hopping patterns. For example, if estimated system throughput is used as a performance parameter that is optimized, the dynamic frequency hopping management device 310 may generate an estimated system throughput parameter using equation 3 with the exception that the summation is taken over all the links in the complete system instead of only the links for a particular base station 110–114. The frequency hopping patterns assigned to all the actively communicating links for the base station 112 that correspond to an estimated system throughput that exceeds a system throughput threshold may be assigned to optimize the estimated system performance. Alternatively, the dynamic frequency hopping management device 310 may assign a new frequency hopping pattern for all the links supported by the base station 112 that provide an estimated system throughput that exceeds a current estimated system throughput by a performance gain threshold.

Centralized Assignment

Figure 5:
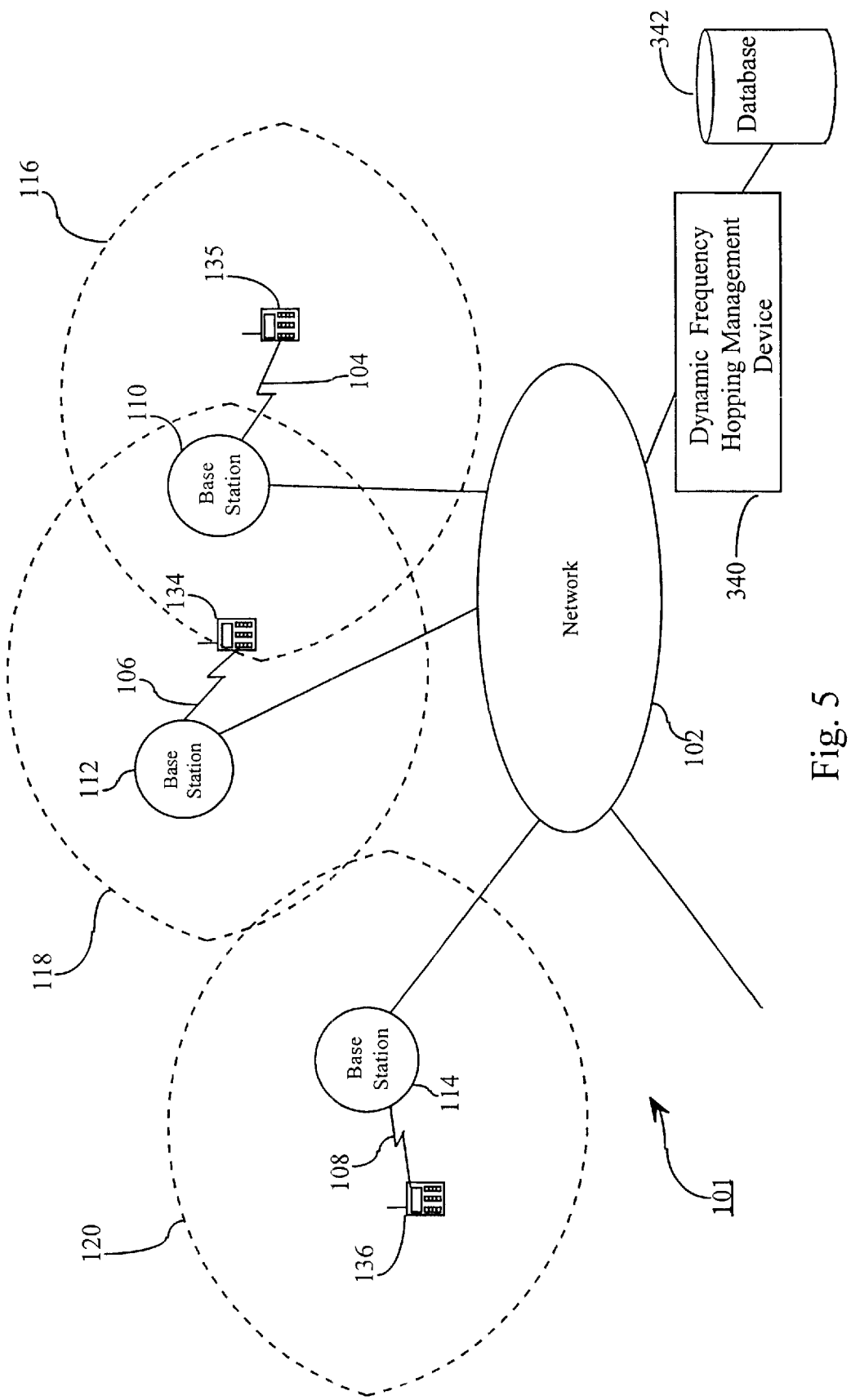
FIG. 5 is an exemplary block diagram of a dynamic frequency hopping system having a centralized dynamic hopping device.

In the centralized assignment technique, the dynamic frequency hopping management device 310 may be a separate unit (or a specifically assigned base station 110–114, for example) that interfaces with all the base stations 110–114 through the network 102. As shown in FIG. 5, a dynamic frequency hopping system 101 includes a dynamic frequency hopping management device 340 that is connected to the network 102 and a database 342 coupled to the dynamic frequency hopping management device 340. The dynamic frequency hopping management device 340 receives information (detected or generated) as well as the frequency hopping patterns from all the base stations 110–114. The dynamic frequency hopping management device 340 provides for optimum estimated system performance by reviewing each of the frequency hopping patterns to verify whether a different frequency hopping pattern may be assigned to improve system performance.

For example, the dynamic frequency hopping management device 340 may generate estimated throughput for a current frequency hopping pattern assignment for all currently active links and also possible estimated throughputs for new potential frequency hopping patterns for the currently active links. The dynamic frequency hopping management device 340 may permute the frequency patterns through possible frequency patterns and select potential frequency patterns that provide an optimum possible estimated throughput. For example, if a possible estimated throughput exceeds the original estimated throughput by a threshold value, then the dynamic frequency hopping management device 340 may change the frequency pattern assignments to new frequency hopping patterns that corresponds to the optimum estimated throughput. In this way, the dynamic frequency hopping system 101 is constantly maintained at an optimum estimated system performance level.

The dynamic frequency hopping management device 340 may also determine optimum estimated performance based on the estimated system performance damage concept disclosed in U.S. Patent application Ser. No. 09/453,566 entitled "Wireless Network Resource Allocation" filed on December 3, which is herein incorporated by reference. A new frequency hopping pattern may be assigned for a particular link if the maximum estimated system gain that corresponds to a new frequency hopping pattern exceeds a gain threshold for the current frequency hopping pattern assignment.

While the above discussion addresses changing a frequency hopping pattern of a currently active link, the dynamic frequency hopping management device 310, 340 also assigns new frequency hopping patterns for a link request. The link request may be received from a terminal 134–136 when placing a call or initiating a data transfer, for example; when a call is received for a terminal 134–136; or when a data packet is being forwarded en route to its destination.

When a request is received for a new link, the dynamic frequency hopping management device 310, 340 may identify a list of available frequencies corresponding to blocks 322 and 326 as shown in FIG. 4, for example. Block 324 is not applicable because a new link has not yet been assigned a frequency hopping pattern. The dynamic frequency hopping management device 310, 340 may assign a new frequency hopping pattern using any of the techniques discussed above, i.e., random assignment of frequencies whose SINR exceed the assignment threshold, assignment of frequencies having highest SINRs, or assigning frequencies that provides for optimum base station estimated performance or estimated system performance.

Figure 6:
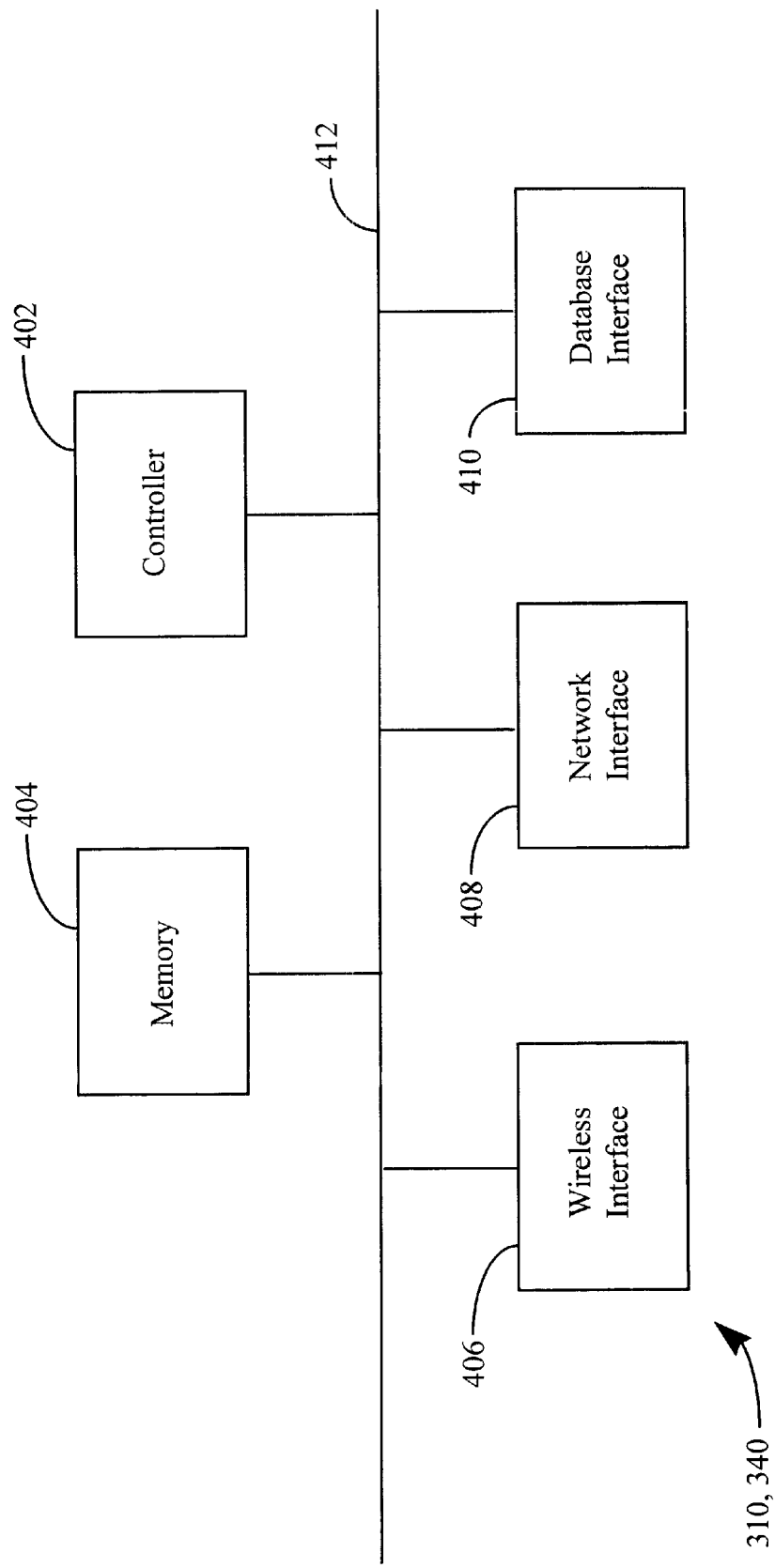
FIG. 6 is an exemplary block diagram of a dynamic frequency hopping management device.

Example Block Diagram and Processes of the Dynamic Frequency Hopping Management Device FIG. 6 shows an exemplary block diagram for the dynamic frequency hopping management device 310, 340. The dynamic frequency hopping management device 310, 340 may include a controller 402, a memory 404, a wireless interface 406, a network interface 408 and a database interface 410. The above components are coupled together via signal bus 412. While the exemplary block diagram shown in FIG. 6 is illustrated in a bus architecture, any other types of architecture as dictated by implementation details may be used as is well known to one of ordinary skill in the art. The functions performed by the dynamic frequency hopping management device 310, 340 may be performed by application specific integrated circuits (ASICs), PLA, PLDs or a program executing in a general purpose or special purpose processor.

The dynamic frequency hopping management device 310, 340 receives detected information and other communication parameters such as frequency hopping pattern assignments, SINRs, etc. from the base stations 110–114 through the network interface 408. The dynamic frequency hopping management device 310, 340 may receive detected information from terminals 134–136 directly, if necessary, via the wireless interface 406. The received information are stored in the database 342 via the database interface 410. The controller 402 controls the dynamic frequency hopping management device processes by performing the required functions using the memory 404 and processing the data that are stored in the database 342. New frequency patterns may be communicated to the terminals 134–136 by sending the new frequency patterns to the respective base stations 110–114 via the network interface 408 or directly to the terminals 134–136 via the wireless interface 406. If the dynamic frequency hopping management device 310, 340 is incorporated in the base stations 110–114, the frequency hopping patterns are transmitted to the terminals 134–136 via the wireless interface 406 and communicated to all other base stations 110–114 via the network interface 408. The functions performed by the dynamic frequency hopping management device 310, 340 are described in conjunction with flowcharts shown in the following FIGURES.

Figure 7:
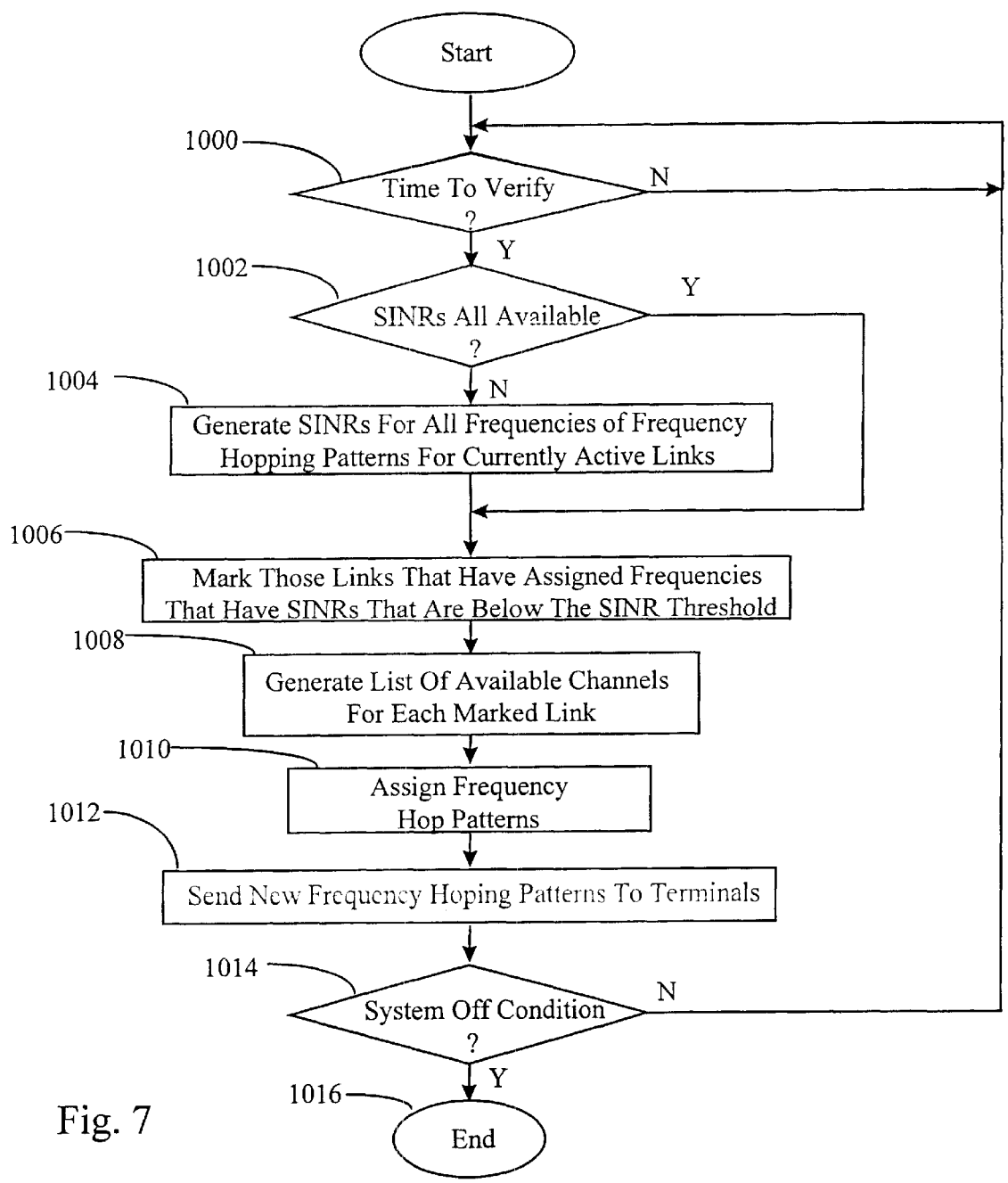
FIG. 7 is a flowchart of an exemplary process of the dynamic frequency hopping management device for assigning frequency hopping patterns based on signal-interference-plus-noise-ratio.

FIG. 7 shows a flowchart for an exemplary process of the dynamic frequency hopping management device 310, 340 for frequency assignment rules 1 and 2. In step 1000, the controller 402 determines whether it is time to verify the frequency hopping pattern assignments. If it is time, the controller 402 goes to step 1002; otherwise, the controller 402 returns to step 1000. In step 1002, the controller 402 determines whether all the SINRs are available via either the database interface 410 or in the memory 404. If available, the controller 402 goes to step 1006; otherwise, the controller 402 goes to step 1004. In step 1004, the controller 402 generates the SINRs that are needed and goes to step 1006.

In step 1006, the controller 402 marks those links whose frequency hopping patterns include frequencies that have corresponding SINRs which are below the SINR threshold and goes to step 1008. In step 1008, the controller 402 generates lists of available channels for all the marked links and goes to step 1010. In step 1010, the controller 402 assigns new frequency hopping patterns to all the marked links and goes to step 1012. In step 1012, the controller 402 sends the new frequency assignments to the terminals 134–136 via the wireless interface 406 (also via a base station 110–114 if the dynamic frequency hopping management device is the centralized unit) and goes to step 1014. In step 1014, the controller 402 determines whether a system off condition has been received. If received, the controller 402 goes to step 1016 and ends the process; otherwise, the controller 402 returns to step 1000 and continues the process.

Figure 8:
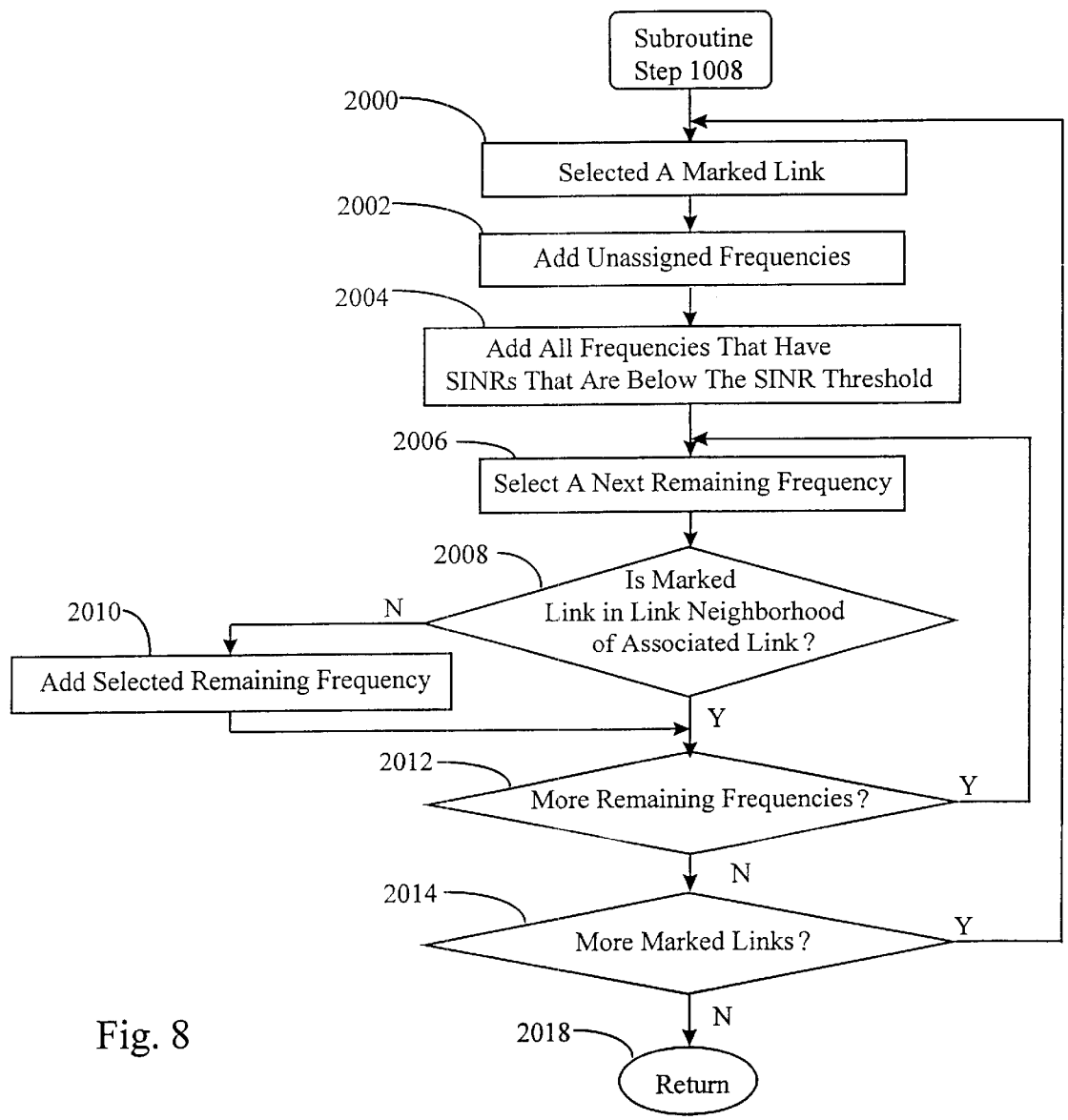
FIG. 8 is a flowchart for an exemplary process for generating a list of available frequencies.

FIG. 8 shows a flowchart of a subroutine that expands step 1008 of FIG. 7 in greater detail. In step 2000, the controller 402 selects a marked link and goes to step 2002. In step 2002, the controller 402 adds unassigned frequencies to a list of available frequencies and goes to step 2004. The list of available frequencies may be stored in the memory 404, for example. In step 2004, the controller 402 adds all the frequencies that have SINRs which are below the SINR threshold to the list of available frequencies and goes to step 2006.

In step 2006, the controller 402 selects a next remaining frequency. The remaining frequencies are those frequencies that are assigned to frequency hopping patterns of currently active links. Then the controller 402 goes to step 2008. In step 2008, the controller 402 determines whether the selected marked link is in a link neighborhood of the link that is associated with the remaining frequency. If associated, the controller 402 goes to step 2012; otherwise, the controller 402 goes to step 2010. In step 2012, the controller 402 determines whether any frequencies still remain. If frequencies still remain, the controller 402 returns to step 2006; otherwise, the controller 402 goes to step 2014. In step 2010, the controller 402 adds the selected remaining frequency to the list of available frequencies and goes to step 2012. In step 2014, the controller 402 determines whether there are more marked links. If there are more marked links, the controller 402 returns to step 2000; otherwise, the controller 402 goes to step 2018 and ends the process.

Figure 9:
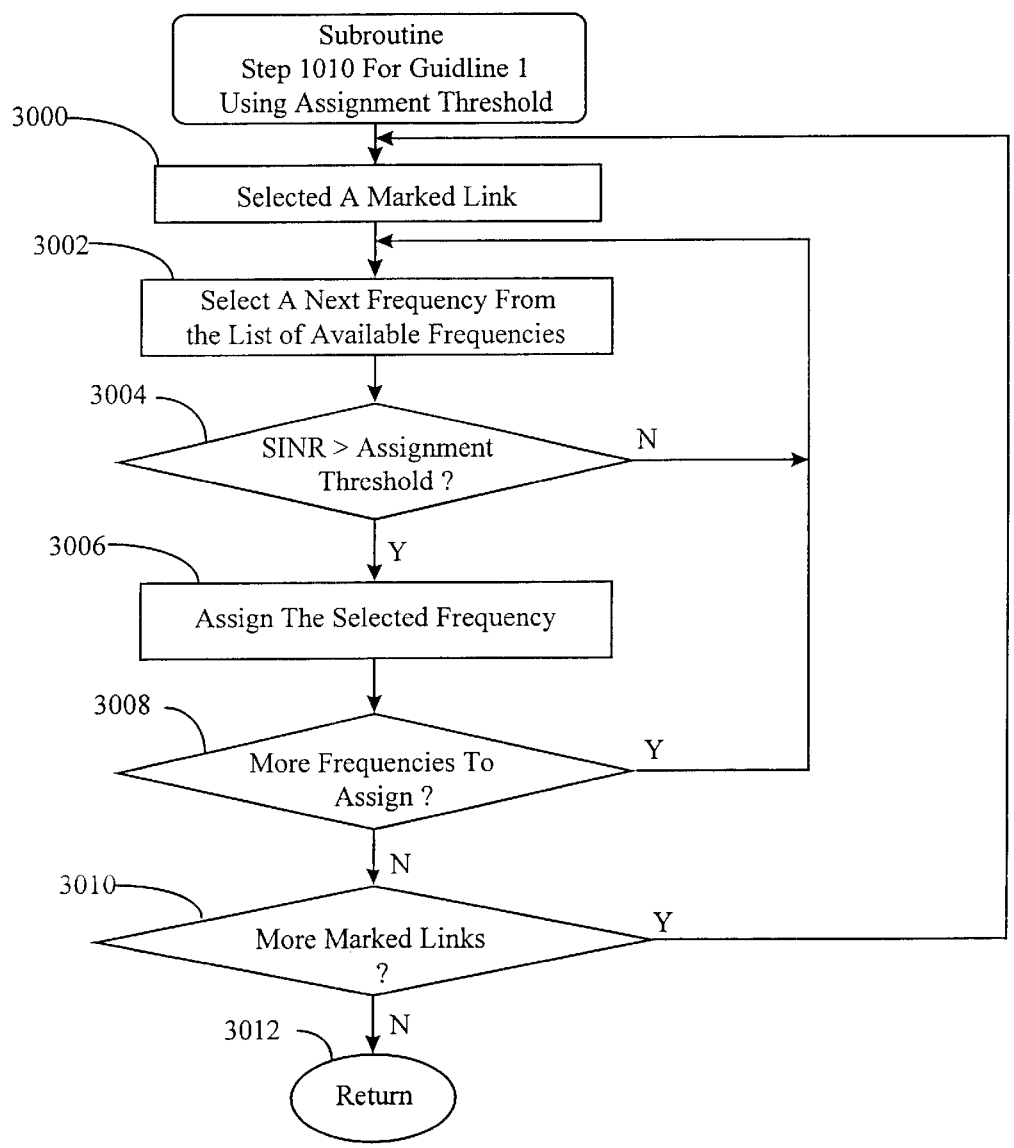
FIG. 9 is a flowchart for an exemplary process for assigning frequencies to a new frequency hopping pattern.

FIG. 9 shows a flowchart of a subroutine that expands step 1010 of FIG. 7 in greater detail for guideline 1 using an assignment threshold. In step 3000, the controller 402 selects a marked link and goes to step 3002. In step 3002, the controller 402 selects a next frequency from the list of available frequencies corresponding to the selected marked link and goes to step 3004. In step 3004, the controller 402 determines whether the SINR corresponding to the selected frequency is greater than the assignment threshold. If greater, the controller 402 goes to step 3006; otherwise, the controller 402 returns to step 3002 and selects a next frequency.

In step 3006, the controller 402 assigns the selected frequency to the frequency hopping pattern of the marked link then goes to step 3008. In step 3008, the controller 402 determines whether more frequencies are to be assigned to the marked link. If more frequencies are to be assigned, the controller 402 returns to step 3002; otherwise, the controller 402 goes to step 3010. In step 3010, the controller 402 determines whether there are more marked links to assign frequencies. If there are more marked links, the controller 402 returns to step 3000 and selects another marked link; otherwise, the controller 402 goes to step 3012 and ends the process.

The process for guideline 2 is similar to the assignment process discussed above with FIG. 9. The difference is in step 3002. Instead of selecting a next frequency from the list of available frequencies, the controller 402 ranks all of the available frequencies based on the magnitude of the SINR associated with each of the frequencies. Instead of step 3004, the controller 402 selects a frequency corresponding to a next highest SINR. All subsequent steps 3006–3012 are identical to those shown in FIG. 9.

Figure 10:
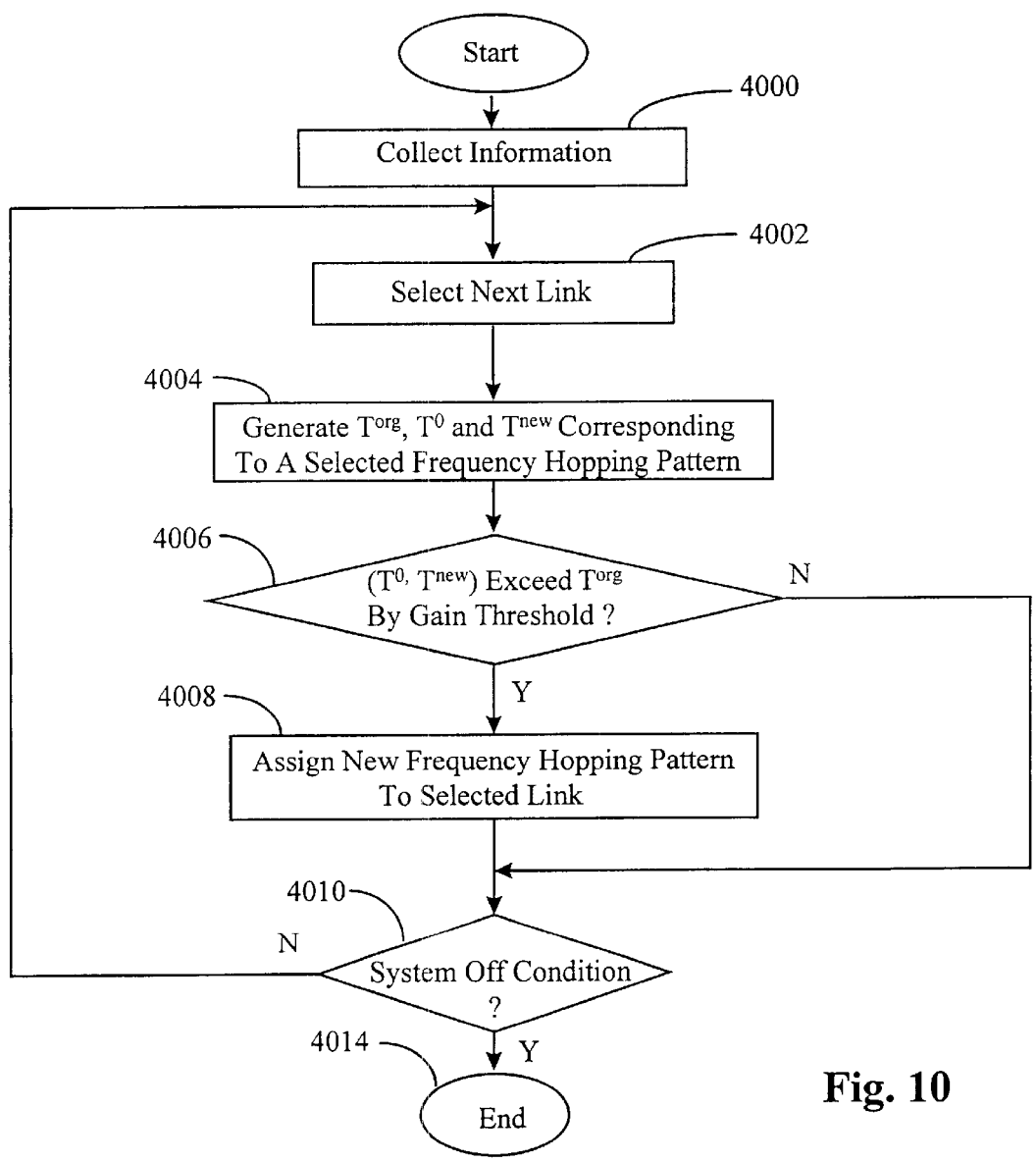
FIG. 10 is a flowchart for en exemplary process for verifying optimum system performance.

FIG. 10 shows an exemplary flowchart for a process of the dynamic frequency hopping management device 310, 340 that assigns frequency hopping patterns to optimize an estimated system performance. In step 4000, the controller 402 collects information from other base stations 110, 114 and from links serviced by the base station 112, for example, and goes to step 4002. In step 4002, the controller 402 selects a next link to verify estimated system performance in relation to the assigned frequency hopping pattern for the link and goes to step 4004. In step 4004, the controller 402 generates three estimated throughput values (estimated throughput values being used as a measure of estimated system performance ) $T^{ORG}$, $T^O$ and $T^{NEW}$. $T^{ORG}$ is the estimated system throughput for the currently assigned frequency hopping pattern for the selected link. $T^O$ is the estimated system throughput if the currently selected link is not permitted to transmit data (assign a transmission mode of 0); and $T^{NEW}$ is the maximum estimated system throughput for all possible frequency hopping patterns that may be assigned to the selected link.

As discussed earlier, a list of available frequencies may be generated for the selected link where the list of available frequencies may include the unassigned frequencies corresponding to block 322 of FIG. 4 and frequencies of currently assigned active links having link neighborhoods that do not include the selected link corresponding to block 326 of FIG. 4. The controller 402 tests every combination of the available frequencies to form possible frequency hopping patterns for the selected link and selects a possible frequency hopping pattern that corresponds to a maximum estimated system throughput $T^{NEW}$. Then the controller goes to step 4006.

In step 4006, the controller 402 determines whether $T^O$ or $T^{NEW}$ exceeds $T^{ORG}$ by a gain threshold. If exceeded, the controller 402 goes to step 4008; otherwise, the controller 402 goes to step 4010. In step 4008, the controller 402 either assigns transmission mode 0 to the selected link or assigns the frequency hopping pattern corresponding to $T^{NEW}$ to the selected link and goes to step 4010. In step 4010, the controller 402 determines whether a system off condition is detected. If detected, the controller 402 goes to step 4014 and ends the process; otherwise, the controller 402 returns to step 4002 and continues the verification process.

Figure 11:
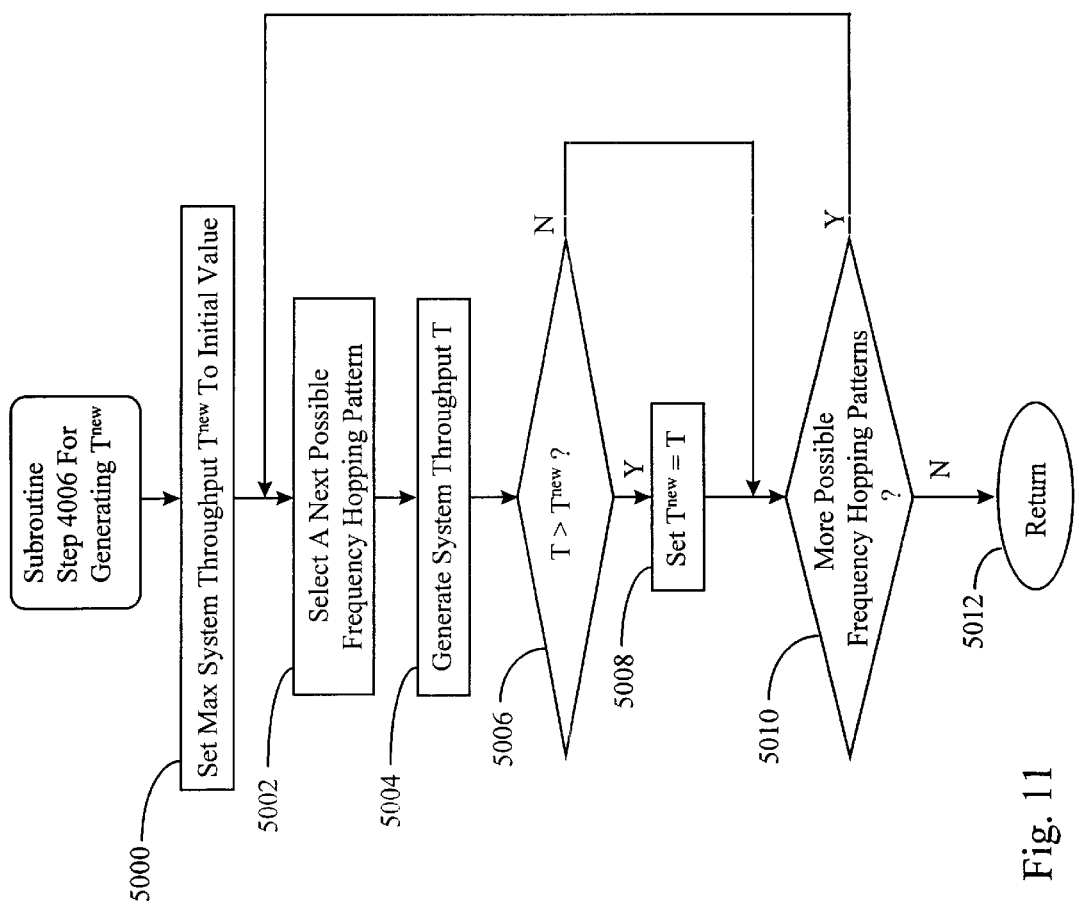
FIG. 11 is a flowchart for an exemplary process for selecting possible frequency hopping patterns.

FIG. 11 shows a flowchart for a subroutine that expands step 4006 of FIG. 10 for generating $T^{NEW}$ in greater detail. In step 5000, the controller 402 sets the maximum estimated throughput $T^{NEW}$ to an initial value and goes to step 5002. In step 5002, the controller 402 selects a next possible frequency hopping pattern. The possible frequency hopping patterns are possible combinations of available frequencies that may be assigned to the selected link. Then the controller 402 goes to step 5004. In step 5004, the controller 402 generates an estimated system throughput T. The estimated system throughput may be the sum of the estimated throughputs of each currently active link generated using equation 2 above where the estimated throughput for each of the frequencies for a frequency hopping pattern is summed together for a currently active link. Then the controller 402 goes to step 5006. In step 5006, the controller 402 determines whether the estimated system throughput T is greater than the maximum estimated system throughput $T^{NEW}$. If T is greater than $T^{NEW}$, the controller 402 goes to step 5008; otherwise, the controller 402 goes to step 5010.

In step 5008, the controller 402 sets $T^{NEW}$ to T and goes to step 5010. In step 5010, the controller 402 determines whether more frequency hopping patterns remain. If more possible frequency hopping patterns remain, the controller 402 returns to step 5002; otherwise, the controller 402 goes to step 5012 and returns to the next processing step of FIG. 10.

The estimated system throughput T may also be generated by using the nominal throughput and throughput damage techniques described in the wireless network resource allocation application, Ser.No. 09/453,566 mentioned above. Also, other system parameters other than system throughput may be used as an optimizing parameter such as a maximum number of terminals to be served by the base station or maintaining specific qualities of service.

The above-described processes in connection with FIGS. 10 and 11 may be applied to a single base station 110–114 to optimize total estimated performance of the links serviced by the base station 110–114 or on a system wide basis to optimize total estimated system performance. In addition, the processes described in FIGS. 7–11 may be applied to determine whether a request for a link should be allocated system resources and assign a frequency hopping pattern or the request denied because a desired system performance cannot be obtained.

Other Alternatives and Modifications

While this invention has been described in conjunction with specific embodiments thereof, it is evident that many alternatives, modifications, and variations will be apparent to those skilled in the art. For example, while the dynamic frequency hopping system 100 is discussed in terms of assigning frequencies to new frequency hopping patterns, the process is equally applicable to assigning different time division multiplexing (TDM) time slots or combinations of time slots and/or frequencies when the new frequency/slot hopping patterns are assigned. If TDM is used and the original frequency hopping pattern/slot assignment is: slot $s_o1$-frequency $f_o1$, slot $s_o2$-frequency $f_o2$, . . . , slot $s_on$-frequency $f_on$, then new frequency hopping pattern/slot assignment may be: slot $s_n1$-frequency $f_n1$, slot $s_n2$-frequency $f_n2$, . . . , slot $s_nn$-frequency $f_nn$. To obtain benefits of frequency diversity, $f_o1$-$f_on$ should be different frequencies and $f_n1$-$f_nn$ should be different frequencies. The system performance may be generated for each available slot and the patterns of slot and frequency pairs that optimizes the system may be selected as the new patterns. Accordingly, preferred embodiments of the invention as set forth herein are intended to be illustrative, not limiting. Various changes may be made without departing from the spirit and scope of the invention.

What is claimed is:

1. A method for assigning frequency hopping patterns in a communication system 1, comprising:

identifying available frequencies for one or more links based on information received from one or more base stations in base station neighborhoods of base stations servicing the links; and assigning a portion of the available frequencies to form frequency hopping patterns for the links based on system performance parameters.

2. The method of claim 1, wherein the identifying comprises determining available frequencies corresponding to a selected link of the links, the method further comprising:

including unassigned frequencies in the available frequencies; and including frequencies assigned to first currently active links in the available frequencies if the selected link is not included in link neighborhoods of the first currently active links.

3. The method of claim 2, further comprising including frequencies assigned to each of second currently active links whose link neighborhoods include the selected link if a performance of each of the second currently active links for the assigned frequencies falls below a threshold.

4. The method of claim 2, wherein a base station neighborhood of the base station neighborhoods corresponds to a base station, the base station neighborhood including base stations that service links whose link neighborhoods include the selected link.

5. The method of claim 1, wherein the assigning frequency hopping patterns comprises:

generating a link quality for each frequency of a frequency hopping pattern of a link;

identifying a first number of replaceable frequencies of the frequency hopping pattern that have link qualities that are less than a link quality threshold;

marking the link if the first number exceeds a marking threshold; and assigning the replacement frequencies to links that are marked.

6. The method of claim 5, wherein the assigning replacement frequencies comprises:

selecting randomly a second number of the available frequencies that correspond to the link, each of the second number of the available frequencies having a link quality that exceeds an assigning threshold, the second number being the same as the first number; and assigning the second number of selected available frequencies to replace the first number of replaceable frequencies.

7. The method of claim 5, wherein the assigning replacement frequencies comprises:

selecting a second number of the available frequencies that correspond to the link, have largest link qualities and exceed the link quality threshold, the second number being the same as the first number; and assigning the second number of the selected available frequencies to replace the replaceable frequencies.

8. The method of claim 5, wherein the link quality includes signal-interference-plus-noise-ratio (SINR), block error rate or bit error rate quality.

9. The method of claim 1, wherein the assigning frequency hopping patterns comprises:

selecting ones of the available frequencies that:
a) correspond to a selected link, and
b) either optimize an estimated performance of the link, or optimize estimated performances of one or more other links serviced by a base station servicing the link; and assigning the selected ones of the available frequencies to a new frequency pattern for the link.

10. The method of claim 9, wherein the optimum estimated performance includes one or more of highest estimated throughput, an estimated throughput that exceeds a throughput threshold, a predetermined level of estimated quality of service, a maximum number of terminals serviced at a set level of estimated quality, or an estimated error rate less than a error rate threshold.

11. The method of claim 1, wherein the assigning frequency hopping patterns comprises:

receiving a token in a base station;

selecting ones of the available frequencies that correspond to the link and optimize an estimated communication system performance; and assigning the selected ones of the available frequencies to a new frequency pattern for the link.

12. The method of claim 1, wherein the assigning frequency hopping patterns comprises:

receiving information from all base station of the communication system in a centralized unit;

selecting ones of the available frequencies that optimize an estimated communication system performance; and assigning the selected ones of the available frequencies to new frequency patterns to the links.

13. The method of claim 1, wherein the communication system uses time division multiplexing (TDM), the method further comprising:

identifying available slots corresponding to the identified available frequencies;

assigning a combination of the available slots and the available frequencies based on system performance parameters.

14. A dynamic frequency hopping communication system, comprising:

a database;

a dynamic frequency hopping management device coupled to the database, the dynamic frequency hopping management device identifies available frequencies for one or more links based on information received from one or more base stations in base station neighborhoods of base stations servicing the links, and assigns a portion of the available frequencies to form frequency hopping patterns for the links based on system performance parameters.

15. The system of claim 14, wherein the dynamic frequency hopping management device determines available frequencies corresponding to a selected link of the links, includes unassigned frequencies in the available frequencies, and includes frequencies assigned to currently active links in the available frequencies if the selected link is not included in link neighborhoods of the currently active links.

16. The system of claim 15, wherein the dynamic frequency hopping management device includes frequencies assigned to each of the currently active links if a performance of each of the currently active links for the assigned frequencies falls below a threshold.

17. The system of claim 14, wherein a base station neighborhood of the base station neighborhoods corresponds to a base station, the base station neighborhood including base stations that service links whose link neighborhoods include the selected link.

18. The system of claim 14, wherein the dynamic frequency hopping management device generates a link quality for each frequency of a frequency hopping pattern of a link, identifies a first number of replacement frequencies of the frequency hopping pattern that have link qualities that are less than a link quality threshold, marks the link if the first number exceeds a marking threshold, and assigns the replacement frequencies to links that are marked.

19. The system of claim 18, wherein the dynamic frequency hopping management device selects randomly a second number of the available frequencies that correspond to the link, each of the second number of the available frequencies having a link quality that exceeds an assigning threshold, the second number being the same as the first number, the dynamic frequency hopping management device assigning the second number of selected available frequencies to replace the replaceable frequencies.

20. The system of claim 18, wherein the dynamic frequency hopping management device selects a second number of the available frequencies that correspond to the link, have largest link qualities and exceed the link quality threshold, the second number being the same as the first number, the dynamic frequency hopping management device assigning the second number of the selected available frequencies to replace the replaceable frequencies.

21. The system of claim 18, wherein the link quality includes signal-interference-plus-noise-ratio (SINR), block error rate or bit error rate quality.

22. The system of claim 14, wherein the dynamic frequency hopping management device:
selects ones of the available frequencies that:
a) correspond to the link; and
b) one of optimize an estimated performance of the link or optimize estimated performances of one or more other links serviced by a base station servicing the link; and
assigns the selected ones of the available frequencies to a new frequency pattern for the link.

23. The system of claim 22, wherein the optimum estimated performance includes one or more of highest estimated throughput, an estimated throughput that exceeds a throughput threshold, a predetermined level of estimated quality of service, a maximum number of terminals serviced at a set level of estimated quality, or an estimated error rate less than a error rate threshold.

24. The system of claim 14, wherein the dynamic frequency hopping management device receives a token, selects ones of the available frequencies that correspond to the link and optimize an estimated communication system performance, and assigns the selected ones of the available frequencies to a new frequency pattern for the link.

25. The system of claim 14, wherein the dynamic frequency hopping management device receives information from all base station of the communication system, selects ones of the available frequencies that optimize an estimated communication system performance, and assigns the selected ones of the available frequencies to new frequency patterns to the links.

26. The system of claim 14, wherein the communication system uses time division multiplexing (TDM), the dynamic frequency hopping management device identifying available slots corresponding to the identified available frequencies, assigning a combination of the available slots and the available frequencies based on system performance parameters.

* * * * *